United States Patent
Reifferscheid

(10) Patent No.: US 9,744,746 B2
(45) Date of Patent: Aug. 29, 2017

(54) FIRE-RETARDANT EDGE MATERIAL FOR PANELS, CORRESPONDING SANDWICH PANEL, AND FIRE-RETARDANT COVER LAYER

(71) Applicant: Lufthansa Technik AG, Hamburg (DE)

(72) Inventor: Moritz Reifferscheid, Basedow (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 14/907,434

(22) PCT Filed: Jul. 15, 2014

(86) PCT No.: PCT/EP2014/065150
§ 371 (c)(1),
(2) Date: Jan. 25, 2016

(87) PCT Pub. No.: WO2015/010960
PCT Pub. Date: Jan. 29, 2015

(65) Prior Publication Data
US 2016/0207288 A1    Jul. 21, 2016

(30) Foreign Application Priority Data

Jul. 23, 2013 (DE) .......................... 10 2013 214 391

(51) Int. Cl.
*B32B 15/098* (2006.01)
*A47B 96/20* (2006.01)
(Continued)

(52) U.S. Cl.
CPC .......... *B32B 15/098* (2013.01); *A47B 96/201* (2013.01); *B29C 63/0026* (2013.01);
(Continued)

(58) Field of Classification Search
CPC .............................................. B32B 2307/3065
See application file for complete search history.

(56) References Cited

U.S. PATENT DOCUMENTS

| 5,429,326 | A | * | 7/1995 | Garesche | .................. | B32B 3/10 |
|  |  |  |  |  |  | 156/157 |
| 8,784,978 | B2 | * | 7/2014 | Apoorva | .................. | B32B 7/12 |
|  |  |  |  |  |  | 428/172 |

(Continued)

FOREIGN PATENT DOCUMENTS

| CA | 2 640 413 | 9/2007 |
| CN | 2857641 | 1/2007 |

(Continued)

OTHER PUBLICATIONS

WO2005070666_Machine_translate, retrived from the EPO Website on Oct. 14, 2016.*

(Continued)

*Primary Examiner* — Babajide Demuren
(74) *Attorney, Agent, or Firm* — Saliwanchik, Lloyd & Eisenschenk

(57) ABSTRACT

The invention relates to an edge material for panels, the edge material being constructed from a plurality of bonded layers. The edge material comprises a first layer, which is non-metallic, and a core layer, which is made of at least one metal layer. The edge material also comprises a second layer, which is non-metallic. Furthermore, the invention relates to a corresponding sandwich panel and to a corresponding cover layer for panels.

16 Claims, 2 Drawing Sheets

(51) Int. Cl.
  *B32B 15/08* (2006.01)
  *B32B 1/04* (2006.01)
  *B29C 63/00* (2006.01)
  *B32B 21/00* (2006.01)
  *B32B 3/08* (2006.01)
  *B32B 15/04* (2006.01)
  *B32B 15/20* (2006.01)
  *B32B 27/42* (2006.01)
  *B29L 9/00* (2006.01)
  *B29L 31/60* (2006.01)

(52) U.S. Cl.
  CPC ............... *B32B 1/04* (2013.01); *B32B 3/08* (2013.01); *B32B 15/043* (2013.01); *B32B 15/08* (2013.01); *B32B 15/20* (2013.01); *B32B 21/00* (2013.01); *B32B 27/42* (2013.01); *B29L 2009/003* (2013.01); *B29L 2031/608* (2013.01); *B32B 2250/40* (2013.01); *B32B 2307/3065* (2013.01); *B32B 2479/00* (2013.01); *B32B 2605/00* (2013.01)

(56) References Cited

U.S. PATENT DOCUMENTS

| | | | | |
|---|---|---|---|---|
| 2007/0194482 A1* | 8/2007 | Douglas | ............... | B32B 27/12 264/173.11 |
| 2008/0090477 A1* | 4/2008 | Balthes | ............... | B29C 43/003 442/136 |
| 2009/0242217 A1* | 10/2009 | van de Loenhorst | .... | A62C 8/06 169/46 |
| 2010/0058699 A1* | 3/2010 | Cropper | ............... | B32B 21/14 52/506.1 |
| 2010/0098943 A1* | 4/2010 | Temchenko | ............... | B32B 7/12 428/355 AC |
| 2010/0104844 A1* | 4/2010 | Rollins | ............... | B32B 27/36 428/220 |
| 2012/0291377 A1* | 11/2012 | Riebel | ............... | B32B 27/36 52/232 |
| 2013/0129998 A1* | 5/2013 | Mallette, Sr. | ............... | B32B 7/02 428/213 |
| 2014/0057075 A1* | 2/2014 | Wang | ............... | B32B 37/12 428/138 |
| 2016/0025371 A1* | 1/2016 | Parks | ............... | F16L 59/029 138/141 |
| 2016/0221311 A1* | 8/2016 | Weinberg | ............... | B29C 70/465 |

FOREIGN PATENT DOCUMENTS

| | | | | |
|---|---|---|---|---|
| CN | 201049532 | | 4/2008 | |
| DE | 200 16 842 | U1 | 9/2000 | |
| DE | 202004001010 | | 1/2005 | |
| DE | 20 2005 001 617 | U1 | 5/2005 | |
| DE | GB 2422803 | A * | 8/2006 | ....... B32B 17/10293 |
| DE | 20 2006 003 156 | U1 | 5/2007 | |
| DE | 10 2006 006 611 | A1 | 9/2007 | |
| DE | WO 2007101499 | A1 * | 9/2007 | ............... B32B 7/06 |
| EP | 1 186 398 | | 3/2002 | |
| EP | 2 055 864 | | 5/2009 | |
| FR | 2 962 362 | | 1/2012 | |
| GB | 1 303 139 | A | 1/1973 | |
| GB | 2 422 803 | B | 4/2010 | |
| WO | WO 2005/070666 | A1 | 8/2005 | |
| WO | WO 2008/049464 | A1 | 5/2008 | |

OTHER PUBLICATIONS

FR2962362_Machine_translate, retrived from the EPO website on Oct. 14, 2016.*
First Examination Report issued by the German Patent and Trademark Office on Apr. 3, 2014, for German Patent Application No. 10 2013 214 391.5.
"Produkte—Hochwertige Multiplexkanten aus exotischen Hölzern," *Ostermann GmbH*, 2014, accessed from https://www.ostermann.eu/DE/kanten-2/multiplexkanten.
International Search Report dated Oct. 13, 2014, for International Application No. PCT/EP2014/065150.
First Examination Report, issued by the Chinese Patent and Trademark Office dated Mar. 2, 2017, for Chinese Patent Application No. 201480035860.7, which is the Chinese national stage application of International Patent Application No. PCT/EP2014/065150, from which the subject application is a U.S. national stage application.

* cited by examiner

FIRE-RETARDANT EDGE MATERIAL FOR PANELS, CORRESPONDING SANDWICH PANEL, AND FIRE-RETARDANT COVER LAYER

CROSS REFERENCE TO A RELATED APPLICATION

This application is a National Stage Application of International Application Number PCT/EP2014/065150, filed Jul. 15, 2014; which claims priority to German Patent Application No. 102013214391.5, filed Jul. 23, 2013; both of which are incorporated herein by reference in their entirety.

BACKGROUND

Panels are used as rigid, planar components for producing various structures. Conventional panels generally have a constant thickness and may be manufactured on a large industrial scale. Panels are often produced and used without a frame, i.e. structures are not provided that surround the sides of the panels. Sandwich panels generally comprise a core material which can effectively absorb compressive loads acting across the surface of the cover plies, but are susceptible to damage from compressive point loads, as may occur in particular due to incorrect operations being carried out by persons during furniture construction or interior work. Examples of such core materials include honeycomb structures or hard foams.

Therefore, in particular in lightweight construction, when using sandwich panels, measures are required to protect the core material from damaging effects, and therefore the edges of a panel are protected by edge strips, supporting edges or veneer edges. Hardening filler materials are an option for protecting honeycomb structures, and said materials can fill the honeycombs that are open at the sides. Furthermore, plastics edges in thicknesses of 3 mm to 7 mm may also be glued onto the edges.

Owing to fire-protection requirements, in particular in the field of aviation, the protection of open edges is of particular importance. Conventional edge strips, as are used in general furniture construction, do not provide sufficient fire protection, i.e. flames acting on the edge strip meet with only insufficient resistance and so they will quickly reach the core material therebehind. Conventional edge strips that have a usually decorative metal layer make it possible to meet high fire-protection requirements; however, these strips are only suitable for covered furniture edges when sandwich panels are used, since the compression resistance to point loads is insufficient. In addition, even the smallest scratches on the metal surface quickly become visible. Although the resistance to penetration for point loads could be increased by using considerably thicker metal layers, the processing complexity increases significantly. In addition, the weight would be increased significantly at the same time, and this is undesirable in particular in the field of aviation and is associated with many drawbacks.

Although plastics edges that are specifically approved for aviation have the desired fire resistance at corresponding layer thicknesses, they cannot be produced as rolled goods owing to the layer thickness required, inter alia. Therefore, the plastics edges have to be cut separately for each edge of a panel and have to be matched to the other plastics edges at the corners. Furthermore, the plastics edge may show on the side of the surface of the panel under a finish or a decorative layer, which may be detrimental to the high-quality visual appearance of the panel. Said edges may only begin to show after a longer period of time as a result of standard loads, and therefore the edges showing in an undesired manner cannot be identified during production.

Furthermore, in panels that have particularly high fire-protection requirements, it may be necessary to increase the fire resistance of the conventional cover materials.

The problem addressed by the invention is to provide an edge material, a sandwich panel and a cover layer which overcome the above-mentioned drawbacks.

BRIEF SUMMARY

The invention relates to a fire-retardant edge material for panels, the edge material being constructed from a plurality of bonded layers. Furthermore, the invention relates to a sandwich panel comprising a first cover ply and a second cover ply that are made of cover materials. The sandwich panel comprises a core material between the cover materials of the first cover ply and the second cover ply and side edges between the first cover ply and the second cover ply. The invention also relates to a fire-retardant cover layer for panels.

An edge material for panels is proposed, the edge material being constructed from a plurality of bonded layers. According to the invention, the edge material comprises a first layer, which is non-metallic, and the edge material also comprises a core layer, which is made of at least one metal layer. Furthermore, the edge material comprises a second layer, which is non-metallic. The core layer is arranged between the first layer and the second layer.

A corresponding edge material that is fire-retardant or of low flammability can protect a material positioned thereunder for a sufficiently long amount of time in the event of fire, as a result of which the aviation regulations for fire-protection requirements for the interior fittings of an aircraft and the fire-protection regulations for yachts or land vehicles can be met. At the same time, the edge material can be unrolled from a roll and can be applied to the edges of panels, in particular to the edges of sandwich panels, in a simple and cost-effective manner. Furthermore, the edge material achieves sufficiently high resistance to point loads or dents, and therefore said material can be used on visible edges and when fitting out the interiors of aircraft or ships in areas accessible to the public. Furthermore, the edge material may be designed to be very thin, only a proportion thereof being the metal layer. The non-metal layers may have a significantly lower density than the metal layer in this case, and therefore a light edge material having sufficient mechanical strength is produced owing to the low material thickness and the low average density. A low weight is advantageous when fitting out interiors of vehicles, ships and in particular aircraft, in order to achieve low fuel consumption or good dynamic behaviour. The edge material may advantageously be used in particular as an edge material of low flammability when fitting out the interiors of aircraft, yachts or caravans.

The structure of the edge material is different from the conventional approach when constructing sandwich layers, according to which the stronger and also denser materials are arranged on either side of a weaker and therefore less dense material. In the proposed edge material, the stronger metal layer is in the centre and is surrounded by the less strong materials. The first non-metal layer and the second non-metal layer make it possible for the edge material to be easily bonded to a panel and for said material to be bent around small bend radii. In advantageous embodiments, the edge material may be bonded to the first non-metal layer or to the second non-metal layer. The resistance to point loads may in particular be achieved by the combination of the non-metal layers and the metal core layer. In this case, the core layer has a higher fire resistance than the first and the second layer, so that said core layer contributes in particular to the fire-retardant behaviour of the edge material, and therefore the edge material as a whole can prevent fire from directly stressing panel material in a vertical fire test, or at least considerably reduces the fire load of the panel material in the region of the edge.

Preferably, the core layer is made of two bonded metal layers. The use of two metal layers improves the thermal insulation and the dissipation of the heat during a fire or under intense effects of heat compared with a single metal layer. As a result, the actual heat input at the point of the fire is reduced. This leads to a lower fire load on the material therebehind, for example the core material of a sandwich panel, and thus to said core material being protected. On one hand, this is achieved by the resulting heat transfer between the two metal layers, and on the other hand, the bonded connection between the metal layers may expand or partially delaminate at an appropriate level of heat input, so that the transfer of heat into a metal layer that is positioned further thereunder is significantly impaired. As a result, the thermally insulating effect of the edge material can be intensified, and this can increase the resistance to burning through.

In preferred embodiments, the edge material has a material thickness of between 0.3 mm and 3.0 mm, more preferably of between 0.3 mm and 1.2 mm. A corresponding edge material allows sufficient fire protection and good workability from a continuous roll, and can be applied to rounded edges having correspondingly small bend radii. In addition, the compression resistance to point loads is sufficiently high for the edge material to be able to be used in areas that frequently come into contact with persons. Persons may for example press keys or cutlery against the edges in an inappropriate manner, and therefore high point loads may occur. Here, the thickness is preferably so low that the cover layer does not have to be extended over the edge material, as a result of which the edge material cannot show under the uppermost layer of a panel or of a finish in the first place. Furthermore, in possible embodiments the material thickness may also be selected to be comparatively high, since the metal layer limits the expansion of the edge material, so that it becomes more unlikely that the edge material will show.

Furthermore, the metal layers preferably have a thickness of between 0.1 mm and 0.5 mm, more preferably of between 0.2 mm and 0.35 mm. A corresponding thickness is advantageous in order to achieve a sufficient thermally insulating effect and if necessary also good dissipation of heat, it being possible to keep the weight as low as possible at the same time. Furthermore, metal layers having a corresponding thickness can be advantageously bent at the standard bend radii when fitting out interiors or during furniture construction.

Preferably, the metal layers consist of aluminium or an aluminium base alloy.

An aluminium base alloy is understood to be an alloy which has a percentage by mass of at least 50% aluminium in the alloy composition. Aluminium is characterised by correspondingly good corrosion behaviour and a comparatively low density. Furthermore, aluminium has sufficient thermal conductivity and high reflective properties, as a result of which the flammability of the edge material or the materials to be protected thereunder can be reduced.

In preferred embodiments, the first layer and/or the second layer consist of a composite material, the composite material having a percentage by mass of phenolic resin of at least 20%. The composite material may for example be a laminated material made of phenolic-resin-impregnated paper, wood or fabric. The use of phenolic resin allows for good fire resistance. Other materials, such as glass fibres or carbon fibres, may also be combined with phenolic resin as a matrix material.

In advantageous embodiments, a metal or non-metal decorative layer is arranged on the first layer and/or the second layer. A decorative layer on the surface of the first and/or second layer makes it possible to adjust the visual and haptic surface properties individually. In possible embodiments, a finish or another coating may also be applied to the surface.

Furthermore, the problem addressed by the invention is solved proceeding from the preamble of claim 8, in conjunction with the characterising features thereof. A sandwich panel comprising a first and second cover ply that are made of cover materials is proposed, the sandwich panel comprising a core material between the first cover ply and the second cover ply. The sandwich panel comprises side edges between the first cover ply and the second cover ply, wherein according to the invention at least the core material is covered at the sides by an edge material of the above-described type.

In advantageous embodiments, at least one cover ply is made of a cover material, the cover material being an edge material of the above-described type.

Furthermore, the problem addressed by the invention is solved proceeding from the preamble of claim 10, in conjunction with the characterising features thereof. A cover layer for panels is proposed, the cover layer being made at least in part of an edge material of the above-described type.

A corresponding fire-retardant cover layer may give a panel, in particular a sandwich panel, significantly higher resistance to catching fire and/or burning through. The sandwich panel can thus achieve a high level of fire protection without structural changes.

BRIEF DESCRIPTION OF THE DRAWINGS

The invention is explained in the following on the basis of preferred embodiments, with reference to the accompanying drawings, in which.

DETAILED DESCRIPTION

Figure 1:
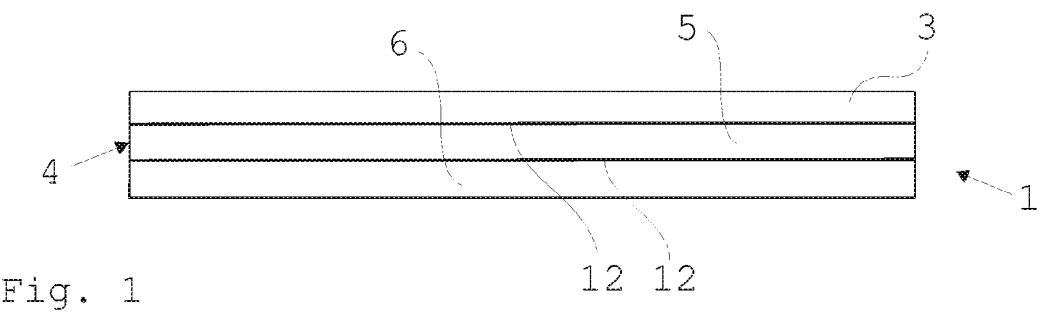
FIG. 1 is a cross section through a multi-layered edge material having a metal layer as the core material.

FIG. 1 shows an advantageous embodiment of a cross section through a multi-layered edge material 1 having a metal layer 5 as a core material 4. The first layer 3 and the second layer 6 are made of phenolic-resin-impregnated paper in this case; however, other non-metal layers, such as pure plastics layers or composite materials, may optionally also be used without phenolic resin, it being possible to achieve particularly good results using phenolic-resin-based composite materials. There is a bonded connection 12 which holds the individual layers together between the first layer 3 and the metal layer 5, as well as between the metal layer 5 and the second layer 6.

In this embodiment, the first layer 3 exhibits a significantly higher tolerance to scratches than a single metal surface, which for example can be achieved by a higher elasticity of the surface of the first layer 3 than a metal surface. The higher tolerance relates in particular to the visibility of scratches or other surface irregularities, that is to say to permanent irregularities that have been subsequently made in the surface. In this way, a high-quality appearance can be maintained for longer. In addition, the material can be worked with less caution, and this allows more rapid manual processing. A person with a metal object cannot push through the edge material 1 having the corresponding multi-layered structure without using excessive force. Overall, the edge material means that sandwich panels are rendered more durable.

Figure 2:
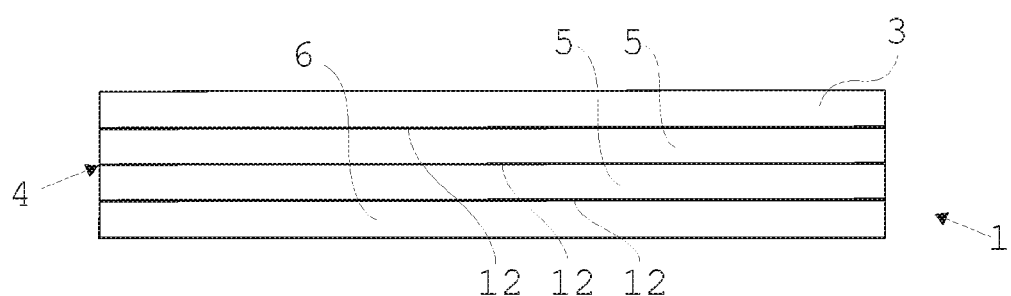
FIG. 2 is a cross section through a multi-layered edge material having two metal layers as the core material.

FIG. 2 shows another advantageous embodiment of an edge material 1, which comprises two metal layers 5 as a core layer 4. The two metal layers 5 have a bonded connection 12 therebetween. Bonding two metal layers 5, which preferably consist of aluminium, improves the fire protection and the resistance to the edge material 1 being punctured compared with the use of just one single metal layer 5. When two metal layers 5 are used, they can also each be designed to have a lower thickness, preferably half the thickness, than would be required if a single metal layer 5 is used which by itself is designed to be a core layer 4. In each of the embodiments in FIG. 1 and FIG. 2, the edge material 1 preferably has a symmetrical structure. It may therefore be possible to bond the edge material 1 to the first layer 3 or to the second layer 6 on an edge 10 of a panel 2 or of a sandwich panel 7. In possible advantageous embodiments, the core layer 4 may also be made of three or more metal layers 5.

Figure 3:
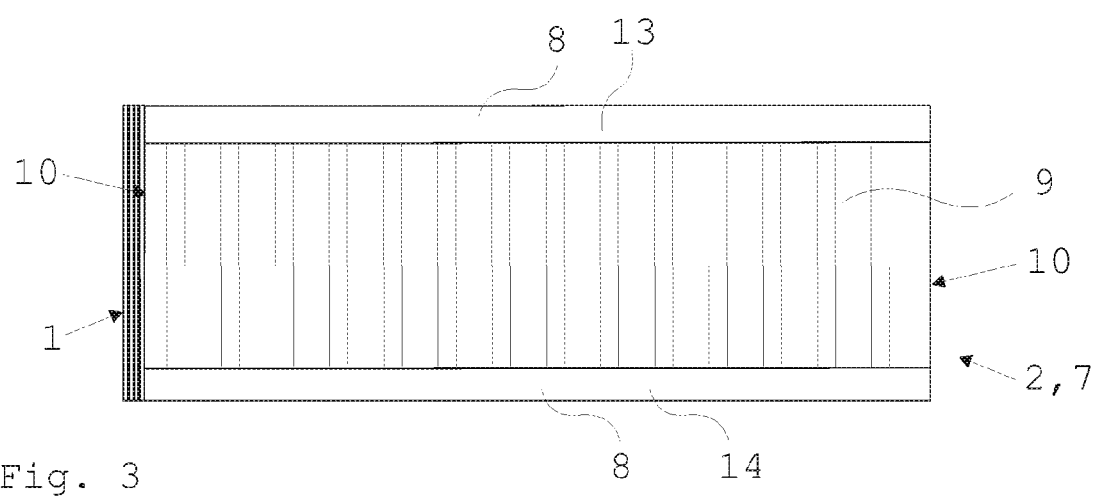
FIG. 3 is a cross section through a sandwich panel having an edge which is closed by an edge material.

FIG. 3 shows a panel 2, in this embodiment a sandwich panel 7, comprising a first cover ply 13 and a second cover ply 14 made of a cover material 8 on either side of a core material 9. In this embodiment, the core material 9 has a honeycomb structure. The edges 10 of the sandwich panel 7 are produced between the cover materials 8 at the sides and on the side that is facing the observer. In the region of the edges 10, the core material 9 of the sandwich panel 7 is initially open, and therefore it is exposed to fire, heat and mechanical surface influences in an unprotected manner. Owing to the cut honeycomb structure of the core material 9, the exposed surface is particularly large, which results in the high fire load in the event of fire. In FIG. 3, an edge material 1 has been applied or bonded to the left-hand edge 10 of the sandwich panel 7, which material closes the sandwich panel 7 at the side. The core material 9 can thus be protected to a sufficient extent in the event of a fire. In this embodiment, the edge material 1 has the structure having two metal layers 5 according to FIG. 2. Furthermore, the weight of the sandwich panel 7 that is added by the proposed edge material 1 can be kept low, since in particular the mass of the metal used (aluminium in this embodiment) can be kept low. At the same time, good resistance to point loads on the edges 10 and to sharp objects penetrating the core material 9 via the edges 10 can be produced. The non-metal surface of the first layer 3 and of the second layer 6 of the edge material 1 allows for simple further processing, for example a finish, and exhibits higher tolerance to the visibility of scratches on the surface than a metal surface, so that a higher-quality visual appearance can be achieved in a long-lasting manner.

Figure 4:
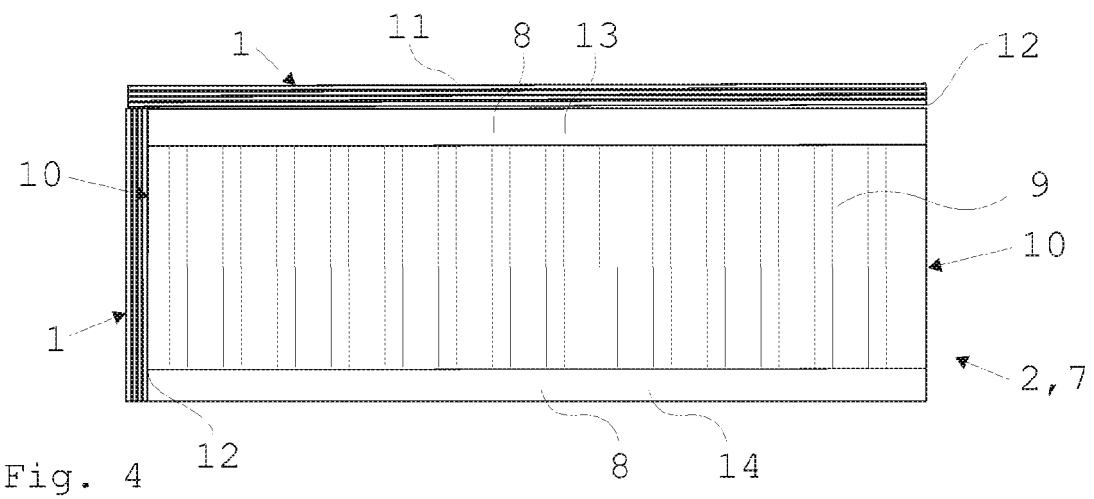
FIG. 4 is a cross section through a sandwich panel having an edge which is closed by an edge material and having an additional cover layer.

FIG. 4 shows the sandwich panel 7 from the embodiment in FIG. 3. A cover layer 11 made of the above-described edge material 1 is bonded to the cover ply 13 of the sandwich panel 7. In this way, the resistance of the sandwich panel 7 to fire, catching fire and/or burning through, in this embodiment in particular from above, can be increased. In this way, the sandwich panel 7 or panels 2 in general can be additionally given improved fire protection in regions or over an extensive area. A cover layer 11 can be applied to a sandwich panel 7 or panel 2 on one side or two sides.

The cover layer 11 made of the edge material 1 is advantageous for high-gloss finishes compared with the cover plies 13 that are made of a cover material 8 made of conventionally used fibre composite materials, for example glass-fibre-reinforced plastics material, since the edge material 1 has a significantly lower level of undulations than the conventional cover materials 8. In addition, the strength of a cover layer 11 made of the edge material 1 results in a tolerance to the surface being abraded. Conventional cover materials 8, which are suitable for a high-gloss finish, only reach insufficient strength values, are flammable or can only be processed in furniture construction with considerable additional complexity.

Figure 5:
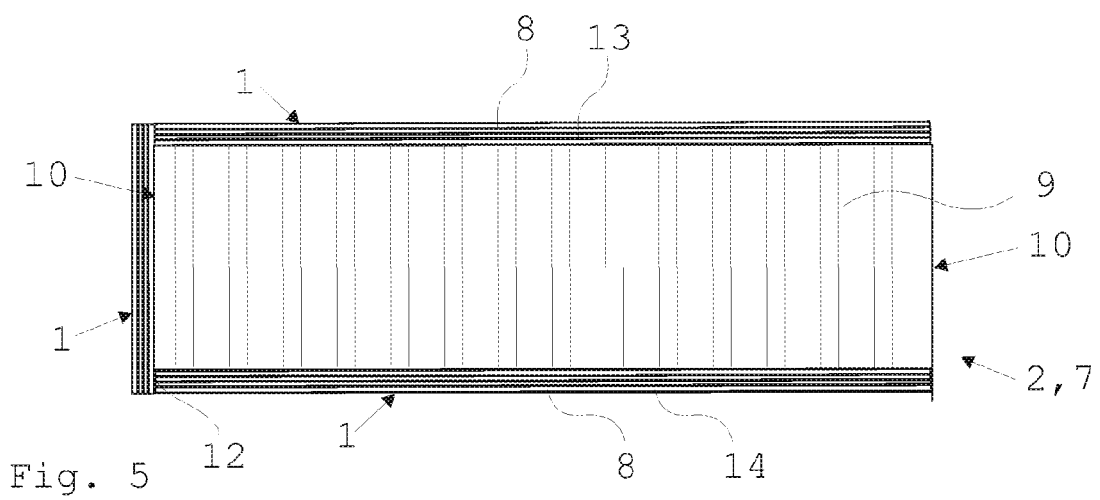
FIG. 5 is a cross section through a sandwich panel having an edge material as a first and second cover ply.

FIG. 5 shows another advantageous embodiment of a sandwich panel 7. In this embodiment, the cover material 8 of the first cover ply 13 and second cover ply 14 is made of the edge material 1, so that the above-described edge material 1 substitutes the conventional cover materials 8 of a sandwich panel 7. This makes possible a light sandwich panel 7 having good fire-retardant properties, it being possible to omit an additional cover layer 11, while it is also possible to apply a corresponding additional layer, however.

EMBODIMENTS

Embodiment 1

Edge material (1) for panels (2), the edge material (1) being constructed from a plurality of bonded layers, characterised in that
the edge material (1) comprises a first layer (3), which is non-metallic,
the edge material (1) comprises a core layer (4), which is made of at least one metal layer (5), and
the edge material (1) comprises a second layer (6), which is non-metallic, the core layer (4) being arranged between the first layer (3) and the second layer (6).

Embodiment 2

Edge material (1) according to Embodiment 1, characterised in that the core layer (4) is made of two bonded metal layers (5).

Embodiment 3

Edge material (1) according to either Embodiment 1 or Embodiment 2, characterised in that the edge material (1) has a material thickness of between 0.3 mm and 3.0 mm.

Embodiment 4

Edge material (1) according to any of the preceding Embodiments, characterised in that the metal layers (5) have a thickness of between 0.1 mm and 0.5 mm.

Embodiment 5

Edge material (1) according to any of the preceding Embodiment, characterised in that the metal layers (5) consist of aluminium or an aluminium base alloy.

Embodiment 6

Edge material (1) according to any of the preceding Embodiments, characterised in that the first layer (3) and/or the second layer (6) consist of a composite material, the composite material having a percentage by mass of phenolic resin of at least 20%.

Embodiment 7

Edge material (1) according to any of the preceding Embodiments, characterised in that a metal or non-metal decorative layer is arranged on the first layer (3) and/or the second layer (6).

Embodiment 8

Sandwich panel (7) comprising a first cover ply (13) and a second cover ply (14) that are made of cover materials (8), the sandwich panel (7) comprising a core material (9) between the cover materials (8) of the first cover ply (13) and the second cover ply (14), the sandwich panel (7) comprising side edges (10) between the first cover ply (13) and the second cover ply (14), characterised in that at least the core material (9) is covered at the sides by an edge material (1) according to any of the preceding Embodiments.

Embodiment 9

Sandwich panel (7) according to Embodiment 8, characterised in that at least one cover ply (14) is made of a cover material (8), the cover material (8) being an edge material (1) according to any of Embodiments 1 to 7.

Embodiment 10

Cover layer (11) for panels (2), characterised in that the cover layer (11) is made of an edge material (1) according to any of Embodiments 1 to 7.

The invention claimed is:
1. An edge material for a panel, comprising:
a first layer,
wherein the first layer is non-metallic;
a core layer,
wherein the core layer is made of at least one metal layer; and
a second layer,
wherein the second layer is non-metallic,
wherein the core layer is arranged between the first layer and the second layer,
wherein the core layer is made of a first metal layer and a second metal layer,
wherein the first metal layer and the second metal layer are bonded directly together, and
wherein the edge material has a material thickness between 0.3 mm and 3.0 mm, and each of the first metal layer and the second metal layer has a thickness between 0.1 mm and 0.5 mm.

2. The edge material according to claim 1,
wherein each of the first metal layer and the second metal layer consists of aluminum or an aluminum base alloy.
3. The edge material according to claim 1,
wherein:
(i) the first layer consists of a composite material,
wherein the composite material has a percentage by mass of phenolic resin of at least 20%;
(ii) the second layer consists of a composite material,
wherein the composite material has a percentage by mass of phenolic resin of at least 20%; or
(iii) the first layer consists of a first composite material and the second layer consists of a second composite material,
wherein each of the first composite material and the second composite material has a percentage by mass of phenolic resin of at least 20%.
4. The edge material according to claim 1,
wherein:
(i) a metal or non-metal decorative layer is arranged on the first layer;
(ii) a metal or non-metal decorative layer is arranged on the second layer; or
(iii) a first metal or non-metal decorative layer is arranged on the first layer and a second metal or non-metal decorative layer is arranged on the second layer.
5. A sandwich panel, comprising:
a first cover ply,
wherein the first cover ply is made of a first cover material;
a second cover ply,
wherein the second cover ply is made of a second cover material;
a core material arranged between the first cover material of the first cover ply and the second cover material of the second cover ply;
at least one side edge,
wherein each side edge of the at least one side edge includes:
a first cover edge of the first cover ply;
a second cover edge of the second cover ply; and
a core edge of the core material that runs between the first cover edge of the first cover ply and the second cover edge of the second cover ply; and
an edge material according to claim 1,
wherein the edge material according to claim 1 is applied or bonded to a first side edge of the at least one side edge such that at least a first core edge of the core material of the first side edge of the at least one side edge is covered by the edge material according to claim 1.
6. The sandwich panel according to claim 5,
wherein:
(i) the first cover material is the edge material according to claim 1;
(ii) the second cover material is the edge material according to claim 1; or
(iii) the first cover material and the second cover material are the edge material according to claim 1.
7. A cover layer for panels,
wherein the cover layer is made of an edge material according to claim 1.
8. The sandwich panel according to claim 5, further comprising:
a first cover layer,
wherein the first cover layer covers the first cover ply, and wherein the first cover layer is made of the edge material according to claim 1.

9. The edge material according to claim 1,
wherein each of the first metal layer and the second metal layer consists of aluminum or an aluminum base alloy, and
wherein:
  (i) the first layer consists of a composite material,
   wherein the composite material has a percentage by mass of phenolic resin of at least 20%;
  (ii) the second layer consists of a composite material,
   wherein the composite material has a percentage by mass of phenolic resin of at least 20%; or
  (iii) the first layer consists of a first composite material and the second layer consists of a second composite material,
   wherein each of the first composite material and the second composite material has a percentage by mass of phenolic resin of at least 20%.

10. A sandwich panel, comprising:
a first cover ply,
wherein the first cover ply is made of a first cover material;
a second cover ply,
wherein the second cover ply is made of a second cover material;
a core material arranged between the first cover material of the first cover ply and the second cover material of the second cover ply,
wherein the core material has a honeycomb structure;
at least one side edge,
wherein each side edge of the at least one side edge includes:
  a first cover edge of the first cover ply;
  a second cover edge of the second cover ply; and
  a core edge of the core material that runs between the first cover edge of the first cover ply and the second cover edge of the second cover ply; and
an edge material,
wherein the edge material is applied or bonded directly to a first side edge of the at least one side edge such that at least a first core edge of the core material of the first side edge of the at least one side edge is covered by the edge material, and
wherein the edge material comprises:
  a first layer,
  wherein the first layer is non-metallic;
  a core layer,
  wherein the core layer is made of at least one metal layer; and
  a second layer,
  wherein the second layer is non-metallic,
  wherein the core layer is arranged between the first layer and the second layer,
  wherein the core layer is made of a first metal layer and a second metal layer, and
  wherein the first metal layer and the second metal layer are bonded directly together.

11. The sandwich panel according to claim 10,
wherein each of the first metal layer and the second metal layer consists of aluminum or an aluminum base alloy,
wherein:
  (i) the first layer consists of a composite material,
   wherein the composite material has a percentage by mass of phenolic resin of at least 20%;
  (ii) the second layer consists of a composite material,
   wherein the composite material has a percentage by mass of phenolic resin of at least 20%; or
  (iii) the first layer consists of a first composite material and the second layer consists of a second composite material, and
   wherein each of the first composite material and the second composite material has a percentage by mass of phenolic resin of at least 20%.

12. The sandwich panel according to claim 10, further comprising:
a first cover layer,
wherein the first cover layer covers the first cover ply, and
wherein the cover layer is made of the edge material.

13. The sandwich panel according to claim 10,
wherein the first cover ply is made of the edge material.

14. A sandwich panel, comprising:
a cover ply,
wherein the cover ply is made of a cover material;
a cover layer; and
a core material arranged between the cover material of the cover ply and the cover layer,
wherein the cover layer comprises:
  a first layer,
  wherein the first layer is non-metallic;
  a core layer,
  wherein the core layer is made of at least one metal layer; and
  a second layer,
  wherein the second layer is non-metallic,
  wherein the core layer is arranged between the first layer and the second layer,
  wherein the core layer is made of a first metal layer and a second metal layer,
  wherein the first metal layer and the second metal layer are bonded directly together, and
  wherein each of the first metal layer and the second metal layer has a thickness between 0.1 mm and 0.5 mm.

15. The sandwich panel according to claim 14, further comprising;
a second cover ply,
wherein the second cover ply is made of a second cover material, and
wherein the second cover ply is positioned between the cover layer and the core material.

16. The edge material according to claim 1,
wherein the first layer is bonded directly to the core layer, and
wherein the core layer is bonded directly to the second layer.

* * * * *